Patented July 14, 1931

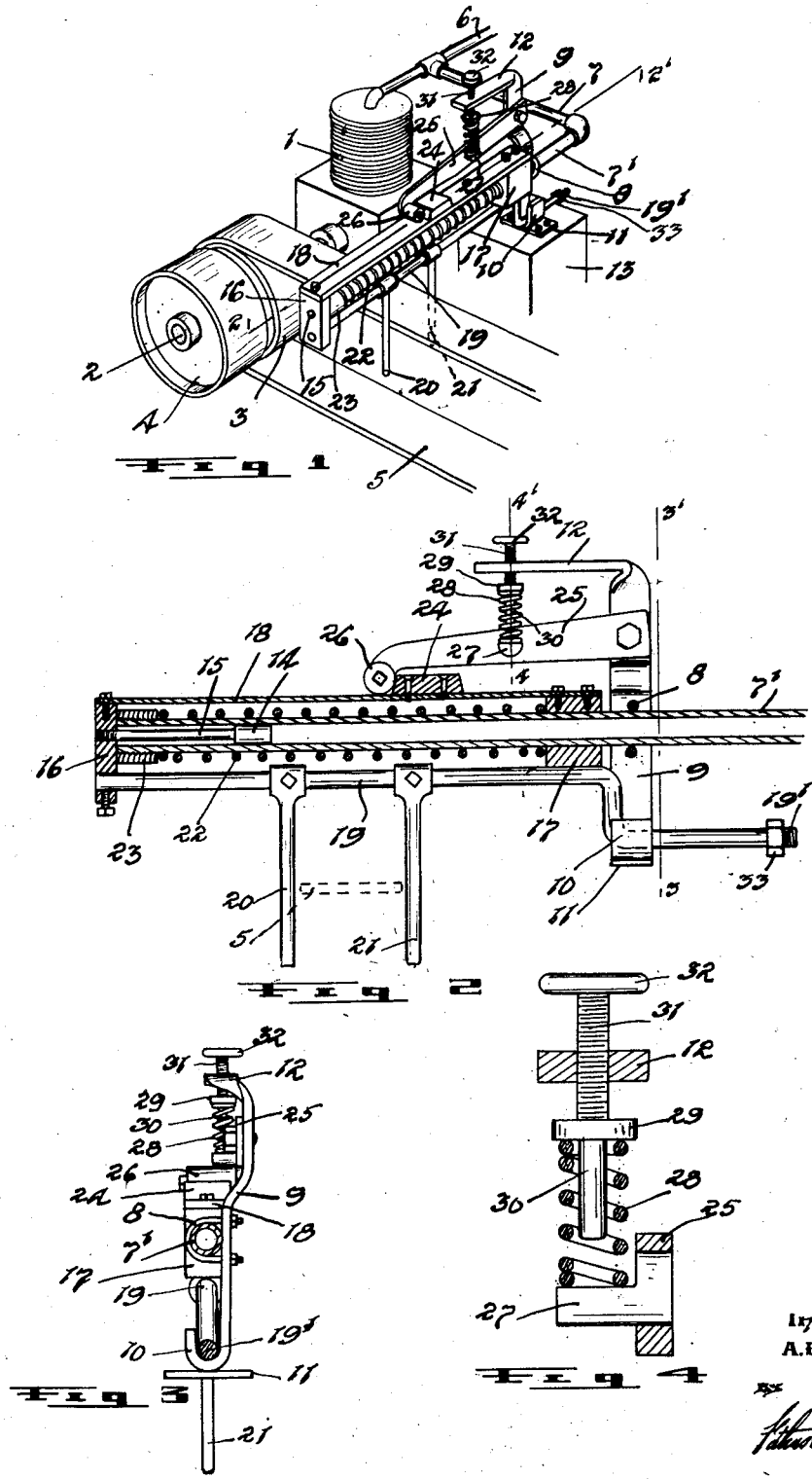

1,814,016

UNITED STATES PATENT OFFICE

AUGUST P. WINTER, OF WINNIPEG, MANITOBA, CANADA

DRIVING BELT CONTROLLING DEVICE

Application filed January 10, 1929. Serial No. 331,645.

The invention relates to improvements in driving belt controlling devices and an object of the invention is to provide a device actuated by rising fluid pressure for automatically shifting the belt from driving to non-driving position and mechanically operated means for automatically shifting the belt from non-driving to driving position upon the pressure dropping.

A more specific object of the invention is to provide a device particularly designed for controlling the driving belt of a fluid compressor, such device being arranged such that when the pressure of the fluid in the line leading from the compressor rises to a predetermined pressure, the belt will be automatically shifted from driving to non-driving position by the pressure in the line and such that upon the pressure in the line having dropped to a predetermined pressure, the belt will be automatically mechanically shifted from the non-driving to driving position.

A further object of the invention is to construct the device so that it can be readily adjusted to operate within desired ranges of pressures.

A further object is to construct the device in a simple, durable and inexpensive manner, so that it can be readily mounted and placed in operating position and such that it will require no attention once it is set.

With the above more important objects in view, the invention consists essentially in the arrangement and construction of parts hereinafter more particularly described, reference being had to the accompanying drawings, in which:—

Fig. 1 is a perspective view of the device.

Fig. 2 is an enlarged detailed vertical sectional view at 2—2' Figure 1.

Fig. 3 is a vertical sectional view at 3—3' Figure 2.

Fig. 4 is an enlarged detailed vertical sectional view at 4—4' Figure 2.

In the drawing like characters of reference indicate corresponding parts in the several figures.

The fluid compressor 1 is of the usual type and is driven by the shaft 2 having the tight pulley 3 and the loose or free pulley 4 as is customary.

The driving belt 5 is shown as driving the pulley 3 and consequently the compressor and said belt can be driven by a suitable prime mover as will be readily understood. A line or pipe 6 leads from the compressor to carry the compressed fluid to whatever point is desired. Customarily the compressor pumps the fluid to a storage tank not shown and the fluid is withdrawn from the storage tank to do the work required.

The present invention relates to a device for automatically controlling the belt 5 in a manner such that when the pressure in the line 6 (or storage tank) rises to a predetermined pressure, the belt will be automatically shifted by the pressure of the fluid from the driving pulley to the loose pulley and upon the pressure in the line dropping to a predetermined pressure, will be actuated mechanically to return the belt to the driving pulley, the whole appliance acting entirely automatically.

In carrying out my invention, I lead a branch pipe 7 from the line 6, such pipe 7 having one end 7' thereof extending above the upper side of the belt in a location adjoining the pulleys and positioned parallel to the driving shaft. To the pipe I secure permanently by a U-bolt or the like 8, a vertically disposed bar 9 having the lower end provided with a hook 10 and a foot piece 11 and the upper end turned into the horizontal plane to provide a supporting arm 12. The foot piece 11 can be fastened in any suitable manner to an underlying base block 13 positioned in front of the compressor. The free end of the pipe 7' forms a cylinder which receives slidably a piston or plunger 14 to which I connect a piston rod 15 carried by a head plate 16.

On the pipe 7' I mount slidably a guide block 17 and the guide block is connected permanently to the head plate by a bar 18 overlying the pipe. To the under side of the guide block, I secure in any suitable manner as by welding, a shifting rod 19 which has the outer end permanently fastened to the plate 16 and the inner end 19' cranked and slidably received within the hook 10. The shifting rod carries downwardly extending fingers 20 and 21 which span the upper side of the belt 5 and are adapted in the shifting of the rod to shift the belt in one direction or the other, that is, from the tight to the loose pulley or vice versa. The cranked end of the shifting rod prevents the parts mounted on the pipe from rotating there around and while permitting of the end sliding movement of said parts as occasioned in the shifting of the belt.

A coiled spring 22 is mounted on the end 7' of the pipe between the sliding block 17 and the collar 23 placed on the outer end of the pipe. The bar 18 has a trip block 24 secured thereto of predetermined length and having slanting side walls as shown and the bar 9 carries pivotally a lever 25 which is provided at its free extremity with a roller 26 adapted to ride the bar 18 and also engage with the trip block 24. The lever is supplied with a bracket 27 adapted to support the lower end of a vertically disposed spring 28, the upper end of which carries a disc 29 and a centering pin 30 extending from the disc into the spring. An adjusting screw 31 is screw threaded through the free end of the arm 12 and engages the disc and is supplied at its upper end with a suitable hand grip 32.

One can adjust the screw 31 as desired to compress the spring 28 a greater or less amount and in so doing cause the roller to bear heavily or otherwise against the bar 18 and obviously this will govern the pressure required to be exerted against the roller to lift the roller and permit it to pass over the block.

In order to better understand the device, I will assume that the compressor is being driven by the belt and the parts are in the position shown in the drawing and that the screw 31 has been adjusted as desired so that the device will throw the belt at a predetermined pressure from the driving to the loose pulley. When the pressure in the line or storage tank to which it leads, rises to the desired set pressure, the pressure of the fluid in the pipe 7, which is the same as the pressure in the line, operating against the piston 14 will overcome the locking action of the roller against the inclined face of the trip block and when such occurs, the piston will move out, the roller will rise and ride over the trip block and drop down at the other side of it and the fingers 20 and 21 will shift the belt from the driving to the loose pulley.

During this movement, the spring 22 becomes compressed and subsequently when the pressure in the line drops as occurs through use of the fluid from the storage tank and has reached a predetermined low pressure, the spring 22 will force the block 17 back and in so doing cause the fingers to pass the belt from the loose pulley to the driving pulley and during this movement, the roller returns over the trip block and resumes the original position as shown in the drawings where it serves to lock the mechanism against any further shifting until the pressure has been built up to the desired pressure in the line at which time, the driving belt will be again automatically shifted to the loose pulley.

In order to positively limit the shifting movement of the belt (as required by the pulleys), the plate 16 is utilized to stop the movement of the rod 19 in one direction by contact with the end of the pipe 7' and a nut 33 is used on the cranked end of the rod 19 to engage the guide hook 10 and limit the travel of the said rod in the other direction. These positive stops insure that the device will always give the same belt throw regardless of the range of pressures under which it is operating.

If, however, the high and low fluid pressures are fixed, the mechanical pressures developed can be determined so that the belt will be thrown the proper distance without having positive stop members to limit the travel of the rod 19.

What I claim as my invention is:—

1. A belt shifting member movable in one direction against a mechanical pressure under a rising fluid pressure and movable in the reverse direction under the mechanical pressure upon the lowering of the fluid pressure and a yielding obstruction opposing the movement of the belt shifting member and controlling the variation of fluid pressure permitted.

2. A belt shifting member movable in one direction against a mechanical pressure under a rising fluid pressure and movable in the reverse direction under the mechanical pressure upon the lowering of the fluid pressure and an adjustable, yielding obstruction opposing the movement of the belt shifting member and controlling the variation of fluid pressure permitted.

3. A belt shifting member movable in one direction against a mechanical pressure under a rising fluid pressure and movable in the reverse direction under the mechanical pressure upon the lowering of the fluid pressure, a trip member movable with the belt shifting member and a pressure applying means riding the belt shifting member and engageable with the trip member.

4. A belt shifting member movable in one direction against a mechanical pressure under a rising fluid pressure and movable in the reverse direction under the mechanical pressure upon the lowering of the fluid pressure, a trip block secured to and moving with the belt shifting member and an adjustable pressure exerting means riding the shifting member and engageable with the block.

5. In combination, a cylinder communicating with a source of varying fluid pressure, a piston slidably mounted within the cylinder, a suitably guided belt shifting member connected to the piston to move therewith in one direction under a rising pressure, a spring associated with the belt shifting member and operating to move the same in the opposite direction upon the lowering of the fluid pressure, a block secured to the belt shifting member and a spring pressed roller riding the shifting member and engageable with the block.

6. In combination, a pipe having one end open and the other end communicating with a source of varying fluid pressure and the open end forming a cylinder, a piston slidably mounted in the cylinder, a piston rod extending from the piston through the open end of the cylinder, a head plate secured to the latter end of the rod, a suitably guided belt shifting member secured to and moving with the head plate, a block slidably mounted on the pipe, a bar connecting the head plate and the block, a collar secured to the cylinder, a spring interposed between the collar and the block, a trip block permanently secured to the bar, a pivoted arm overlying the bar and having the end thereof provided with a roller riding the bar and engageable with the block and adjustable means for yieldingly pressing the arm towards the bar.

Signed at Winnipeg, this 8th day of December, 1928.

AUGUST P. WINTER.